Sept. 19, 1967     D. M. BAILEY     3,341,970

AMMONIA APPLICATOR

Filed Feb. 23, 1965

INVENTOR
DESMOND M. BAILEY

BY    Charles L. Harness

ATTORNEY

United States Patent Office 3,341,970
Patented Sept. 19, 1967

3,341,970
AMMONIA APPLICATOR
Desmond M. Bailey, Memphis, Tenn., assignor, by mesne assignments, to Chevron Research Company, a corporation of Delaware
Filed Feb. 23, 1965, Ser. No. 434,249
4 Claims. (Cl. 47—1.7)

This invention relates to an apparatus. In one specific aspect it relates to an apparatus for treating living plants with ammonia.

In summary, this invention involves a movable vehicular-mounted crop contacting hood of fixed dimensions, open at front and rear, and comprising in combination a fore section consisting of a flared mouth having two side walls and a top wall, said side walls being joined to said top wall, said mouth being joined, at a juncture, to a body section consisting of two side walls and a top wall, said side walls being joined to said top wall, at least one ammonia discharge port being positioned in said body section immediately behind said juncture, the improvement comprising positioning an inert gas nozzle within said hood on the inner surface of each side wall of said body portion, each of said nozzles being positioned at about the midpoint of said side wall about 15–20 inches from the exit, or rear, end of said hood with the discharge port of said nozzle being so oriented that the inert gas stream issuing from said nozzle flows toward the fore, or front, end of said hood substantially parallel to the ground and at an angle of about 35–50° with respect to the wall on which said nozzle is mounted.

Figure 1:
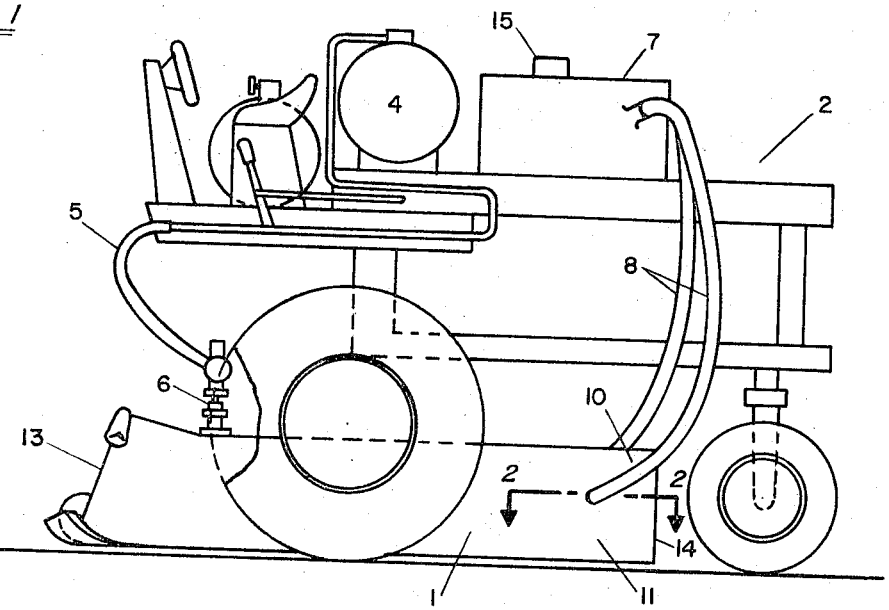
FIG. 1 is a plan view of the apparatus of this invention.

The treatment of living plants with ammonia for such diverse purposes as foliar fertilization, defoliation of said plants (e.g., cotton and soy bean plants) before harvesting crops from said plants, killing plants (e.g., potato vines) before harvesting underground tubers, and wilt harvesting, i.e., wilting leaves of growing plants (e.g., leaves of cotton plants) before harvesting the crop from said plants to facilitate harvesting, is known. The ammonia used for these purposes can be ammonia vapor or a mist of micron-size droplets of liquid anhydrous ammonia, and the plant contacting device can be the hood of a conventional ammonia defoliator (e.g., type described in the Farm Journal, Southwestern edition, August 1961, page 32). Said hood is open at both the front and rear so that plants can readily enter, pass through, and exit from the device.

In commercial practice the treatment of living plants with ammonia has been limited to row crops. The ammonia is passed into the fore portion of an elongated contacting zone, or hood, as said hood is moved lengthwise along the crop row while the stomata are open, thereby contacting the plants with ammonia. Hood speeds of about 2–6 miles per hour, preferably about 4–5 miles per hour, are generally used. Slower speeds reduce the number of acres that the apparatus can cover in one day (thereby increasing the cost of the treatment), and higher speeds can damage the plants or the crop.

I have made the surprising discovery that the quantity of ammonia necessary for any of the above-described treatments of living plants can be greatly reduced by passing an inert gas into the rear portion of the aforesaid hood as said hood moves along the crop row thereby substantially decreasing the amount of ammonia vapor which escapes from the rear end of the moving hood. By inert gas I mean any gas which will not react with ammonia, which will not attack the plants undergoing treatment, which will not attack the hood, and which is non-toxic to animal life. Such gases include air, nitrogen, helium, argon, neon, xenon, and the like. While oxygen is non-toxic I prefer not to use it due to the fire hazard; for the same reason hydrogen would be unacceptable. Since air is readily available, I prefer to use it. When using air as inert gas, it is not necessary to compress the inert gas (air) ahead of time and bring containers of compressed gas (air) to the vehicle on which the hood is mounted. A simple blower device of standard design can be attached to said vehicle and hoses, pipes, or other lines can be used to bring the air from the blower to the inert gas nozzles positioned in the rear portion of the hood.

The effective rate of inert gas flow (the rate of said flow at which optimum biological result, e.g., defoliation, wilting, vine killing, or foliar fertilization, results with a minimum ammonia feed rate) is a function of wind velocity and wind direction. For example, when the hood moves into a strong head wind (e.g., a head wind of about 15 miles per hour) the effective rate of inert gas flow is about 600 standard cubic feet per minute (s.c.f./min.). However, when the hood is traveling with a strong tail wind the effective rate of inert gas flow can be as little as about 20–50 s.c.f./min. Under other conditions intermediate rates of inert gas flow have been found to be effective. For example, in the absence of wind, an effective rate is about 200–300 s.c.f./min. Cross winds have little influence on the inert gas requirement if blowing perpendicular to the direction in which the hood is moving. However, a cross wind blowing toward the fore, or front, end of the hood can increase the inert gas requirement up to about 400–500 s.c.f./min. depending on wind velocity and the angle at which the wind intersects the longitudinal side of the moving hood. On the other hand a cross wind blowing toward the rear, or exit, end of the hood can cut the inert gas requirement to about 75–150 s.c.f./min. depending on wind velocity and angle. Obviously, I do not attempt to treat living plants with ammonia in the presence of a high wind, e.g., a wind of 25–30 or more miles per hour.

I have observed that ammonia vapor escaping from the rear of the hood causes a visible "fog" to appear just behind the crop treating hood as the hood moves longitudinally along a crop row. I have also observed that said visible fog, or ammonia fog, does not appear when inert gas is being passed into the hood according to the process of my invention at a rate effective to produce the optimum biological result with a minimum ammonia feed rate. Thus, I prefer to so regulate the rate at which inert gas is passed into the hood that no visible "fog" appears just behind the hood as said hood moves along a crop row.

Figure 2:
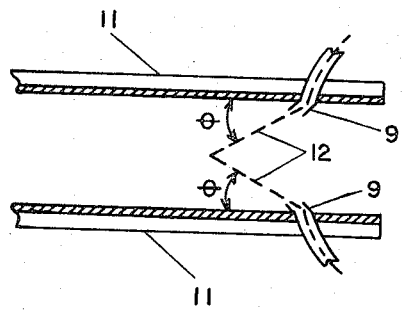
FIG. 2 is a plan view in section of a portion of the apparatus taken along line 2—2.

Referring to the drawings: An elongated contacting zone, or hood, 1 is mounted on a vehicle 2, and ammonia is fed into the fore portion of said hood 1 from ammonia cylinder 4 via line 5 and ammonia ports, or nozzles 6. Air from blower 7 is fed by lines 8 and inert gas nozzles 9 into the rear portion 10 of hood 1. (Alternatively an inert compressed gas, e.g., nitrogen, can be fed to nozzles 9 via lines 8 from a cylinder, not shown in the drawings.) Although the exact positioning of said inert gas nozzles 9 is not extremely critical, I have found that one of said nozzles should be positioned within the rear portion 10 of hood 1 on the inner surface of each side 11 of said hood and that each nozzle should be positioned at about the midpoint of said side wall about 15–20 inches from the exit end 14 of said hood 1. I have also found that each inert gas nozzle must be so directed, or oriented, that the inert gas stream 12 exiting said nozzle will flow toward the forward end 13 of the hood substantially parallel to the ground and at an angle (angle $\theta$ of FIG. 2) of about 35–50° (preferably about 43–48° and optimum about 45°) with respect to the wall on which said nozzle is mounted. The rate at which blower 7 blows air into the hood 1 is regulated by regulator 15. When using an inert gas compressed in a cylinder (not shown) the rate of flow of said gas can be regulated by a valve (not shown) or valve in combination with a flow meter (not shown).

My invention is illustrated further by the following examples which are illustrative only and which are not intended to limit the scope of the invention.

EXAMPLE I

This run was made in mid-October on cotton plants which were highly stressed and partially defoliated by frost; however, about 70% of the cotton plants remaining in the field were green (growing) cotton plants.

Two elongated contacting zones, or hoods, were attached to a tractor. The first hood was a standard hood with a liquid ammonia feed nozzle (to feed micron size droplets of liquid ammonia) positioned just behind the juncture of the mouth and body portions of said hood. The second hood was identical to the first except that air from an air blower mounted on the tractor was fed into said hood via two inert gas nozzles. An inert gas nozzle was positioned within the rear portion of said hood on the inner surface of each side wall of said hood, and each nozzle was positioned at about the midpoint of the respective side wall about 18 inches from the exit end of said hood. Each nozzle was so directed that it discharged a stream of air at an angle of about 45° with respect to the side wall on which said nozzle was mounted (i.e., the angle $\theta$ of FIG. 2 was about 45°), and said stream of air was directed about parallel to the ground.

The above-described apparatus was moved along cotton rows at about 3 miles per hour, while the stomata were open, and while feeding a mist of micron size liquid ammonia droplets into both hoods via the aforesaid ammonia feed nozzles at the rate of about 90 lbs. per acre. During this run the apparatus moved into a head wind blowing at about 4–6 miles per hour; air was fed into the second hood via the aforesaid inert gas nozzles at the rate of about 500 standard cubic feet per minute. A "fog" was visible just behind the first hood as the apparatus moved along the crop rows, but no "fog" was visible behind the second hood.

In about 10 days, defoliation of cotton plants in rows contacted with ammonia in the first hood was about 80% complete while defoliation of plants contacted with ammonia in the second hood was about 94% complete.

EXAMPLE II

The general procedure of Example I was repeated using the apparatus of said example, but in this instance the ammonia rate, in each hood, was about 57 lbs. per acre. A "fog" was visible just behind the first hood as the apparatus moved along the crop rows, but no "fog" was visible behind the second hood.

In about 10 days, defoliation of plants contacted with ammonia in the first hood was only about 65% complete while defoliation of the cotton plants treated in the second hood was about 94% complete.

EXAMPLE III

The general procedure of Example II was repeated using the apparatus of Example II which had been modified to receive ammonia in the form of ammonia vapor. In this instance ammonia vapor at about 25° C. was fed into both hoods via ammonia ports positioned just behind the juncture of the mouth and body portions of the hoods at the rate of about 57 lbs. per acre. A "fog" was visible just behind the first hood as the apparatus moved along the crop rows, but no "fog" was visible behind the second hood.

In about 10 days the results of this run were indistinguishable from those obtained in Example II.

EXAMPLE IV

The apparatus and general procedure of this example were the same as those used in Example I. However, this run was made in late August in a cotton field having a lush growth of cotton plants having a large number of completely ripened bolls on both the lower and upper branches. The ambient field temperature was about 95° F. and the ammonia feed rate was about 120 lbs. per acre. The apparatus moved along the crop rows at about 4–5 miles per hour. In this instance, the run was made on a clear calm day in the substantial absence of wind. Air was fed into the second hood via the inert gas nozzles at the rate of about 200 s.c.f./min. A "fog" was visible just behind the first hood as the apparatus moved along the crop rows, but no "fog" was visible behind the second hood. About 2 hours after treating the cotton plants with ammonia a spindle type cotton picker was moved along the treated crop rows. Said picker picked cotton fiber from the ripened bolls. The picked fiber was substantially free of leaf stain and trash. In 10 days defoliation of all the treated plants was about 98% complete. No difference was observed in the appearance of cotton picked from plants treated under the first and second hoods.

EXAMPLE V

The apparatus and procedure of this run, which was conducted on the same clear, calm afternoon as Example IV, were identical to those of Example IV except that the ammonia rate in this example was about 55 lbs. per acre. A "fog" was visible just behind the first hood as the apparatus moved along the crop rows, but no fog was visible behind the second hood. A very substantial quantity of the cotton fiber picked from plants treated under the first hood was stained by juices exuded from the leaves. Fiber from plants treated under the second hood was not stained. All fiber was substantially free of trash. In about 10 days defoliation of plants treated under the first hood was only about 60% complete while defoliation of those treated under the second hood was about 98% complete.

EXAMPLE VI

The apparatus used in this run was that of Example I. There was a moderate tail wind (ca. 5–7 miles per hour) blowing as the apparatus passed lengthwise along rows of potato vines at about 4 miles per hour. The ammonia rate was 15 lbs. per acre. Air was fed into the second hood via the inert gas nozzles at the rate of about 100 s.c.f./min. A "fog" was visible just behind the first hood as the apparatus moved along the crop rows, but no "fog' was visible behind the second hood. Within about 2 hours after treatment all of the treated potato vines began to turn dark and within 24 hours all of said vines were dead.

EXAMPLES VII

The procedure of Example VI was repeated, but in this instance the ammonia rate was about 5 lbs. per acre. A "fog" was visible just behind the first hood as the apparatus moved along the crop rows, but no "fog" was visible behind the second hood. All of the vines which were treated with ammonia under the second hood had begun to turn dark within about 2–3 hours and all of said vines were dead in about 30 hours. The vines which were treated with ammonia under the first hood showed little darkening after about 3–4 hours and most of said vines were alive after 24 hours. At the end of a week less than about 10% of the vines which were treated with ammonia under the first hood were dead.

EXAMPLE VIII

The procedure of Example V was repeated, but in this instance each hood had a total length (flared mouth section plus hood body) of about 7 feet, rather than about 12 feet as in Example V. A "fog" was visible just behind the first hood as the apparatus moved along the crop rows, but no "fog" was visible behind the second hood (the hood having an inert gas port mounted therein about 18 inches from the exit end of said hood and at about the midpoint of each side wall). Results were substantially identical to those obtained in Example V except that defoliation of plants treated under the first hood was only about 40% complete in about 10 days.

Substantially identical results were obtained with hoods having total lengths of about 7½ to 9 feet and about 8–10 feet.

It will be readily apparent to those skilled in the art that the process of my invention will: (a) Reduce the ammonia dosage required per acre in the foliar fertilization, defoliation, wilt harvesting, and vine killing; (b) Make it possible to shorten the length of the elongated contacting zone (hood) used to expose row crops to ammonia, thereby improving the maneuverability of the contacting apparatus; and (c) Make it possible to secure improved defoliation, i.e., substantially complete defoliation, of stressed (e.g., drought stressed) cotton plants.

What is claimed is:

1. In a movable vehicular-mounted crop contacting hood of fixed dimensions, open at front and rear, and comprising in combination a fore section consisting of a flared mouth having two side walls and a top wall, said side walls being joined to said top wall, said mouth being joined, at a juncture, to a body section consisting of two side walls and a top wall, said side walls being joined to said top wall, at least one ammonia discharge port being positioned in said body section immediately behind said juncture, the improvement comprising positioning an inert gas nozzle within said hood on the inner surface of each side wall of said body portion, each of said nozzles being positioned at about the midpoint of said side wall about 15–20 inches from the exit end of said hood with the discharge port of said nozzle being so oriented that the inert gas stream issuing from said nozzle flows toward the fore end of said hood substantially parallel to the ground and at an angle of about 35–50° with respect to the wall on which said nozzle is mounted.

2. The apparatus of claim 1 in which each inert gas nozzle is positioned about 18 inches from the exit end of the hood.

3. The apparatus of claim 1 in which the discharge port of each inert gas nozzle is so oriented that the inert gas stream from said nozzle flows toward the fore end of the hood substantially parallel to the ground and at an angle of about 43–48° with respect to the wall on which said nozzle is mounted.

4. The apparatus of claim 1 in which the discharge port of each inert gas nozzle is so oriented that the inert gas stream from said nozzle flows toward the fore end of the hood substantially parallel to the ground and at an angle of about 45° with respect to the wall on which said nozzle is mounted.

References Cited

UNITED STATES PATENTS

| | | | |
|---|---|---|---|
| 2,220,316 | 11/1940 | Creswell et al. | 239—151 |
| 2,977,715 | 4/1961 | Lindsay | 47—1.7 |
| 3,238,668 | 3/1966 | Abbott et al. | 47—1.7 |
| 3,238,669 | 3/1966 | Remmert | 47—1.7 |

ABRAHAM G. STONE, *Primary Examiner.*

ROBERT E. BAGWILL, *Examiner.*